(12) United States Patent
Hamamoto et al.

(10) Patent No.: US 9,997,270 B2
(45) Date of Patent: Jun. 12, 2018

(54) LITHIUM ION CONDUCTIVE SUBSTANCE, LITHIUM ION CONDUCTIVE SOLID ELECTROLYTE USING THE LITHIUM ION CONDUCTIVE SUBSTANCE, PROTECTIVE LAYER FOR AN ELECTRODE OF A LITHIUM ION BATTERY, AND METHOD FOR MANUFACTURING THE LITHIUM ION CONDUCTIVE SUBSTANCE

(71) Applicants: Koichi Hamamoto, Aichi (JP); Yoshinobu Fujishiro, Aichi (JP); Danila Victorovich Matveev, Aichi (JP)

(72) Inventors: Koichi Hamamoto, Aichi (JP); Yoshinobu Fujishiro, Aichi (JP); Danila Victorovich Matveev, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 309 days.

(21) Appl. No.: 14/841,800

(22) Filed: Sep. 1, 2015

(65) Prior Publication Data

US 2015/0372347 A1 Dec. 24, 2015

Related U.S. Application Data

(62) Division of application No. 14/237,931, filed as application No. PCT/JP2012/069907 on Aug. 3, 2012, now Pat. No. 9,160,035.

(30) Foreign Application Priority Data

Aug. 12, 2011 (JP) .................................. 2011-176779

(51) Int. Cl.
*H01B 1/06* (2006.01)
*H01B 1/08* (2006.01)
(Continued)

(52) U.S. Cl.
CPC ................ *H01B 1/06* (2013.01); *C01B 25/45* (2013.01); *H01B 1/08* (2013.01); *H01M 6/188* (2013.01);
(Continued)

(58) Field of Classification Search
CPC ........... H01B 1/06; H01B 1/08; H01M 4/362; H01M 4/364; H01M 4/366; H01M 6/18;
(Continued)

(56) References Cited

U.S. PATENT DOCUMENTS 4,985,317 A   1/1991  Adachi et al.
5,702,995 A * 12/1997  Fu ........................... C03C 10/00
                                                           501/10
(Continued)

FOREIGN PATENT DOCUMENTS

JP   H02-162605   6/1990
JP   H06-333577   12/1994
(Continued)

OTHER PUBLICATIONS

International Search Report dated Oct. 16, 2012.
(Continued)

*Primary Examiner* — Harold Pyon
*Assistant Examiner* — Matthew R Diaz
(74) *Attorney, Agent, or Firm* — IPUSA, PLLC

(57) ABSTRACT

A lithium ion conductive substance is provided that is characterized by containing a compound wherein a composite oxide represented by $Li_{1+x+y}Al_xTi_{2-x}Si_yP_{3-y}O_{12}$ ($0 \leq x \leq 1$ and $0 \leq y \leq 1$) is doped with at least one kind of element selected from Zr, Hf, Y, and Sm. Furthermore, a method for
(Continued)

manufacturing the lithium ion conductive substance is provided that includes the following steps: (a) a step of forming an inorganic substance that contains predetermined quantities of a Li component, an Al component, a Ti component, a Si component, and a P component, into a sheet shape, and (b) a step of interposing between materials that contain at least one kind of element selected from Zr, Hf, Y, and Sm, and sintering, a sheet-shaped formed body obtained at step (a).

4 Claims, 6 Drawing Sheets

(51) Int. Cl.
| | | |
|---|---|---|
| *H01M 6/18* | (2006.01) | |
| *H01M 10/052* | (2010.01) | |
| *H01M 10/0525* | (2010.01) | |
| *H01M 10/0562* | (2010.01) | |
| *C01B 25/45* | (2006.01) | |
| *H01M 4/13* | (2010.01) | |
| *H01M 4/36* | (2006.01) | |
| *H01M 4/62* | (2006.01) | |

(52) U.S. Cl.
CPC ..... *H01M 10/052* (2013.01); *H01M 10/0525* (2013.01); *H01M 10/0562* (2013.01); *H01M 4/13* (2013.01); *H01M 4/366* (2013.01); *H01M 4/62* (2013.01); *H01M 2300/0071* (2013.01); *Y02E 60/122* (2013.01); *Y02P 70/54* (2015.11); *Y02T 10/7011* (2013.01)

(58) Field of Classification Search
CPC .. H01M 6/185; H01M 6/188; H01M 10/0561; H01M 10/0562; H01M 10/052; H01M 10/0525; H01M 2300/0065; H01M 2300/0068; H01M 2300/0071; H01M 2300/0074; H01M 2300/0077; C01B 25/30; C01B 25/36; C01B 25/37; C01B 25/372; C01B 25/38; C01B 25/39; C01B 25/45

See application file for complete search history.

(56) References Cited

U.S. PATENT DOCUMENTS

| | | | |
|---|---|---|---|
| 6,214,061 B1 | 4/2001 | Visco et al. | |
| 6,315,881 B1* | 11/2001 | Fu | C03C 4/18 |
| | | | 204/424 |
| 7,211,532 B2* | 5/2007 | Fu | C03C 4/18 |
| | | | 204/429 |
| 8,697,294 B1* | 4/2014 | Tsukamoto | H01M 2/1673 |
| | | | 429/231.4 |
| 2007/0087269 A1 | 4/2007 | Inda | |
| 2008/0161746 A1* | 7/2008 | Visco | A61K 33/00 |
| | | | 604/20 |
| 2008/0220334 A1 | 9/2008 | Inda | |
| 2008/0268348 A1* | 10/2008 | Katoh | H01M 2/1673 |
| | | | 429/323 |
| 2009/0081555 A1 | 3/2009 | Teramoto | |
| 2010/0028782 A1 | 2/2010 | Inda | |

FOREIGN PATENT DOCUMENTS

| | | |
|---|---|---|
| JP | 2002-513991 | 5/2002 |
| JP | 2007-134305 | 5/2007 |
| JP | 2008-112661 | 5/2008 |

OTHER PUBLICATIONS

Hiromichi Aono et. al., The Electrical Properties of Ceramic Electrolytes for LiMxTi2-x(PO4)3+yLi2o,M=Ge,Sn,Hf,andZr Systems, Journal of the Electrochemical Society, vol. 140,No. 7., Electrochemical Society, Jul. 1993, pp. 1827-1833.
Hui Xie et al., Li1.2Zr1.9Ca0.1(PO4)3, a room-temperature Li-ion solid electrolyte, Journal of Power Sources 196 (2011) 7760-7762.
Michele Catti et al., Lithium location in NASICON-type Li+ conductors by neutron diffraction. I. Triclinic α'-LiZr2(PO4)3, Solid State Ionics 123 (1999) 173-180.
Korean Office Action dated Mar. 31, 2015.

* cited by examiner

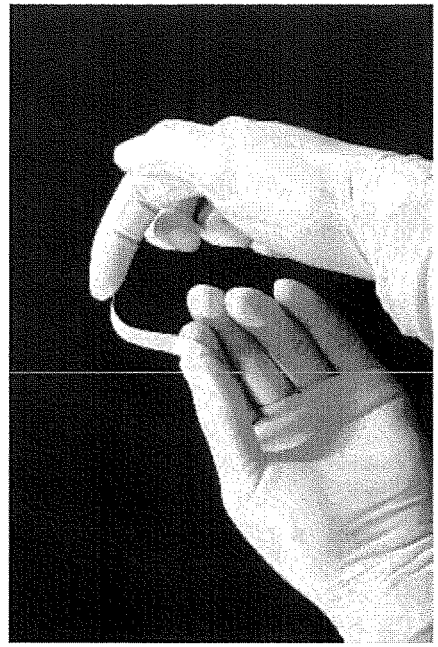
FIG.5

LITHIUM ION CONDUCTIVE SUBSTANCE, LITHIUM ION CONDUCTIVE SOLID ELECTROLYTE USING THE LITHIUM ION CONDUCTIVE SUBSTANCE, PROTECTIVE LAYER FOR AN ELECTRODE OF A LITHIUM ION BATTERY, AND METHOD FOR MANUFACTURING THE LITHIUM ION CONDUCTIVE SUBSTANCE

CROSS-REFERENCE TO RELATED APPLICATIONS

This application is a divisional application of U.S. patent application Ser. No. 14/237,931 filed on Feb. 10, 2014, which is United States National Stage Application of International Application PCT/JP2012/069907 filed on Aug. 3, 2012 and designated the United States, which is based upon and claims the benefit of priority from Japanese Patent Application No. 2011-176779 filed on Aug. 12, 2011, the entire contents of which are hereby incorporated by reference.

TECHNICAL FIELD

The present invention relates to a lithium ion conductive substance, a lithium ion conductive solid electrolyte using the lithium ion conductive substance, a protective layer for an electrode of a lithium ion battery, and a method for manufacturing the lithium ion conductive substance.

BACKGROUND ART

In recent years, demand for a high capacity battery and capacitor capable of being miniaturized or lightened has been increasing along with development of a laptop computer, a mobile instrument such as a portable cellular phone, an electric vehicle, and the like.

For a high-capacity battery or capacitor, ones using a lithium ion conductive substance for an electrolyte, such as a lithium ion battery, a lithium-air battery, and a lithium ion capacitor have been studied conventionally.

Among those, a lithium ion battery has already been put in practical use, and, for an electrolyte thereof, a liquid electrolyte is used wherein an inorganic electrolyte such as lithium perchlorate is dissolved in an organic electrolyte fluid. A liquid electrolyte is problematic in safety, storage stability, long-term reliability, and the like, because there are possibilities of fluid leakage, vaporization, and the like.

In order to solve such a problem, a lithium ion conductive substance capable of being utilized in a solid state has been studied. In particular, a study of a solid lithium ion conductive substance that is a ceramic material has been advanced for a material with incombustibility that leads to safety, no water permeability, and a high water resistance in a Li-air battery that is expected for a next-generation battery. For a solid lithium ion conductive material, for example, Patent Document 1 and Patent Document 2 disclose a partially substituted material of $Li_{1+x+y}Al_xTi_{2-x}Si_yP_{3-y}O_{12}$ and a substance with a perovskite-type structure represented by $Li_xTa_yTiO_3$ and a partially substituted material thereof. Furthermore, Non-Patent Document 1 and Non-Patent Document 2 disclose $LiZr_2(PO_4)_3$ and $Li_{1.2}Zr_{1.9}Ca_{0.1}(PO_4)_3$, respectively.

PRIOR ART DOCUMENTS

Patent Documents

Patent Document 1: Japanese Patent Application Publication No. 2007-134305

Patent Document 2: Japanese Patent Application Publication No. 6-333577

Non-Patent Documents

Non-Patent Document 1: Solid State Ionics 123 (1999) 173-180
Non-Patent Document 2: Journal of Power Sources 196 (2011) 7760-7762

SUMMARY OF THE INVENTION

Problems to be Solved by the Invention

However, for solid lithium ion conductive substances that has a perovskite-type structure or a NASICON-type structure, as disclosed in Patent Documents 1 and 2 and Non-Patent Documents 1 and 2, total conductivities thereof are approximately $10^{-4}$ Scm$^{-1}$ at most. This is not considered to be a sufficient performance wherein a lithium ion conductive property at a room temperature environment is lower, as compared with a liquid lithium ion conductive substance that is currently used, because of a high grain boundary resistance. Furthermore, there is a problem that it is difficult to make a product with a high precision of a surface roughness in a case of attaining a large surface area thereof.

The present invention was made by taking the problems in the conventional techniques into consideration and aims at providing a solid lithium ion conductive substance with a high lithium ion conductive property.

Means for Solving the Problem

The present invention provides a lithium ion conductive substance that is characterized by containing a compound wherein a composite oxide represented by $Li_{1+x+y}Al_xTi_{2-x}Si_yP_{3-y}O_{12}$ ($0 \leq x \leq 1$ and $0 \leq y \leq 1$) is doped with at least one kind of element selected from Zr, Hf, Y, and Sm.

Effects of the Invention

According to the present invention, it is possible to provide a solid lithium ion conductive substance excellent in a lithium ion conductive property thereof.

BRIEF DESCRIPTION OF THE DRAWINGS

FIG. 5 is a photograph for showing a bending rate performance of a sample obtained in Practical Example 2 of the present invention.

EMBODIMENTS FOR IMPLEMENTING THE INVENTION

Figure 1:
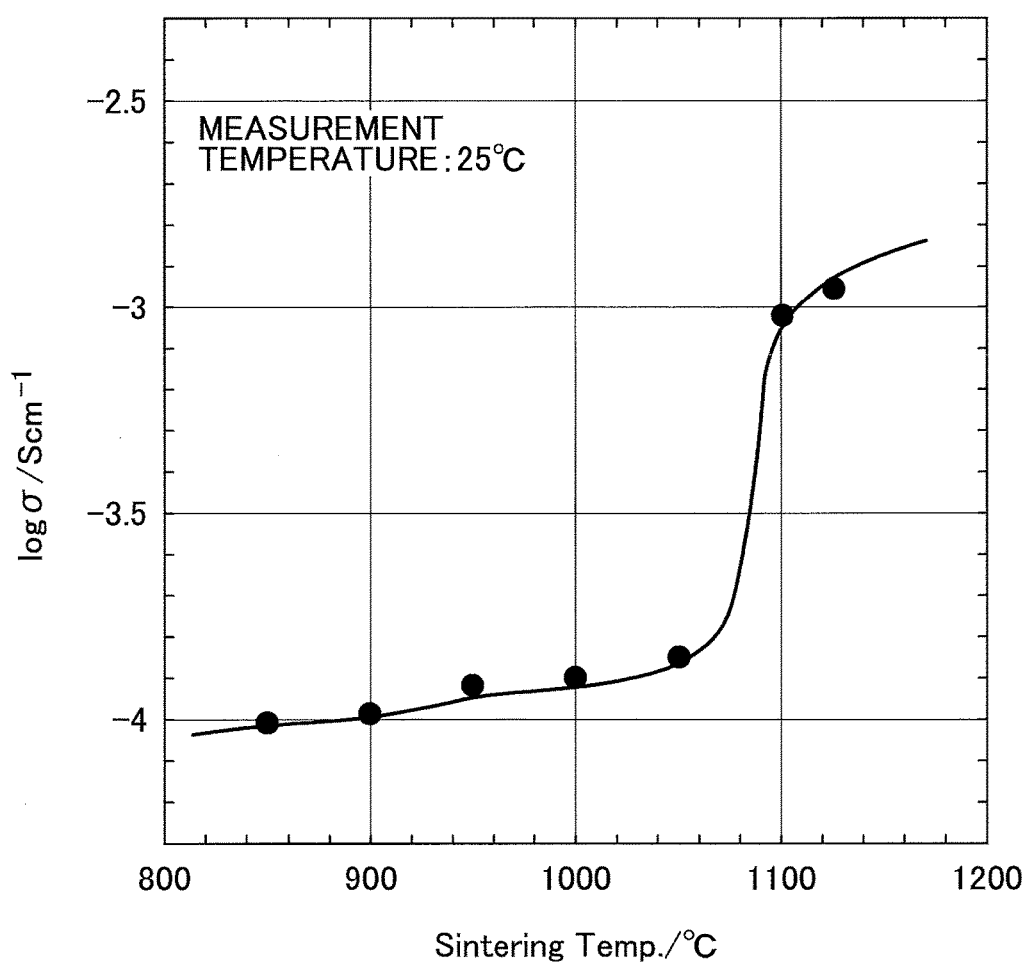
FIG. 1 is a sintering temperature dependence of an ionic conductivity for a sample obtained in Practical Example 1 of the present invention.

Although embodiments for implementing the present invention will be described below, the present invention is not limited to the following embodiments and it is possible to apply a variety of alterations and substitutions to the following embodiments without departing from the scope of the present invention.

First Embodiment

In the present embodiment, a lithium ion conductive substance will be described below.

A lithium ion conductive substance according to the present invention relates to a lithium ion conductive substance, characterized in that a compound represented by $Li_{1+x+y}Al_xTi_{2-x}Si_yP_{3-y}O_{12}$ (0≤x≤1 and 0≤y≤1) is doped with at least one kind of element selected from Zr, Hf, Y, and Sm.

Herein, it is preferable for values of x and y in a composite oxide represented by $Li_{1+x+y}Al_xTi_{2-x}Si_yP_{3-y}O_{12}$ that is a target to be doped to satisfy conditions of (0≤x≤1 and 0≤y≤1, wherein it is more preferable to be (0≤x≤0.4 and 0≤y≤0.6. A manufacturing method thereof is not particularly limited and it is possible to be obtained by each kind of publicly-known manufacturing method. For example, it is possible to be obtained by sintering a raw material mixture that includes compounds that contain elements that compose the compound, that is, a Li-containing compound, an Al-containing compound, a Ti-containing compound, a Si-containing compound, and a 2-containing compound. For a more specific example, it is possible to provide a manufacturing method wherein $Li_2CO_3$, $Li_2TiO_3$, $TiO_2$, $H_3PO_4$, $Al_2(CO_3)_3$, $AlPO_4$, $Al(PO_3)_3$, $Al(OH)_3$, $SiO_2$, $NH_4H_2PO_4$, $(NH_4)_2HPO_4$, and the like are used as raw materials and these are mixed and subsequently sintered.

Then, a method for doping the compound with at least one kind selected from Zr, Hf, Y, and Sm is also not particularly limited.

For example, it is possible to provide a method of preliminary addition thereof to a raw material when the $Li_{1+x+y}Al_xTi_{2-x}Si_yP_{3-y}O_{12}$ is synthesized. Furthermore, it is also possible to provide a doping method wherein, after synthesis of the $Li_{1+x+y}Al_xTi_{2-x}Si_yP_{3-y}O_{12}$, at least one kind selected from Zr, Hf, Y, and Sm, or a compound thereof is added or mixed into a product and this is sintered. Otherwise, it is also possible to provide a doping method wherein the $Li_{1+x+y}Al_xTi_{2-x}Si_yP_{3-y}O_{12}$ is formed into a sheet shape and this is interposed between materials that contain at least one kind of element selected from Zr, Hf, Y, and Sm, and a sintering process is performed.

Furthermore, a doping quantity is also not limited, and it is possible to be determined in view of a required degree of lithium ion conductive property, a strength, a cost, and the like.

Because a lithium ion conductive substance according to the present invention is excellent in a lithium ion conductive property, it is possible to be used as a lithium ion conductive solid electrolyte. Specifically, it is possible to be preferably used as a lithium ion conductive solid electrolyte for a lithium ion battery (a lithium primary battery or a lithium secondary battery), a lithium-air battery, a lithium ion capacitor, or the like.

In particular, it is possible to be preferably used as a lithium ion conductive solid electrolyte for a lithium ion battery. In this case, for example, it is possible to provide a lithium ion battery by arranging a positive electrode and a negative electrode at both sides of a lithium ion conductive substance according to the present invention, further arranging a publicly-known current collector, and packaging them.

Furthermore, an electrode material may react with an electrolyte in a lithium ion battery to degrade a performance thereof. It may be frequent for such a phenomenon to be caused at a negative electrode material wherein it is particularly frequent to be observed in a case where a lithium compound or a metallic lithium is used as a negative electrode material.

In order to prevent such a phenomenon, a protective layer for an electrode based on an electrode material, and for example, a material that is difficult to react with a commonly used liquid electrolyte and has an lithium ion conductive property, may be provided on an electrode surface.

Because the present material has a water resistance, is also difficult to react with these materials, and has a high lithium ion conductive property, it is possible to provide a protective layer for an electrode of a lithium ion battery by using a lithium ion conductive substance according to the present invention. A placement or configuration thereof is determined by a battery structure or the like and is not limited wherein it is sufficient to be configured in such a manner that both of them do not directly contact between an electrode and an electrode part. For example, it is possible to provide a method for covering an electrode part that is a target to be protected, with a lithium ion conductive substance according to the present invention, or the like.

Second Embodiment

In the present embodiment, a preferable method for manufacturing a lithium ion conductive substance that contains a compound wherein a composite oxide represented by $Li_{1+x+y}Al_xTi_{2-x}Si_yP_{3-y}O_{12}$ (0≤x≤1 and 0≤y≤1) is doped with at least one kind of element selected from Zr, Hf, Y, and Sm will be described.

Specifically, a characterization is provided by including the following steps (a) and (b).

(a) a step of forming an inorganic substance that contains a Li component, an Al component, a Ti component, a Si component, and a P component into a sheet shape wherein the inorganic substance contains each component at the following composition ratio expressed in oxide equivalent:

$Li_2O$: equal to or more than 15 mol % and equal to or less than 30 mol %;

$Al_2O_3$: equal to or more than 1 mol % and equal to or less than 10 mol %;

$TiO_2$: equal to or more than 30 mol % and equal to or less than 45 mol %;

$SiO_2$: equal to or more than 1 mol % and equal to or less than 10 mol %; and $P_2O_5$: equal to or more than 22 mol % and equal to or less than 40 mol %;

(b) a step of interposing between materials that contain at least one kind of element selected from Zr, Hf, Y, and Sm, and sintering, a sheet-shaped formed body obtained at step (a).

First, step (a) will be described.

An inorganic substance to be used as a starting raw material is not particularly limited and it is sufficient to contain a Li component, an Al component, a Ti component, a Si component, and a P component at the above-mentioned composition ratio expressed in oxide equivalent.

In particular, it is preferable for the inorganic substance to contain each component at a rate expressed in oxide equivalent that is 16 mol % or more and 30 mol % or less of $Li_2O$, 2 mol % or more and 6 mol % or less, particularly preferably 4.9 mol % or less, of $Al_2O_3$, 30 mol % or more, particularly preferably 35 mol % or more and 40 mol % or less, of $TiO_2$, 2 mol % or more, particularly preferably 5 mol % or more and 10 mol % or less, of $SiO_2$, and 22 mol % or more and 35 mol % or less of $P_2O_5$. It is possible to produce a target substance when sintering is performed at step (b), because each component is contained at such a rate.

Furthermore, it is more preferable for a content(s) of an Al component and/or a Si component included in the inorganic substance to be greater than a stoichiometric composition ratio of a composite oxide represented by $Li_{1+x+y}Al_xTi_{2-x}Si_yP_{3-y}O_{12}$ ($0 \leq x \leq 1$ and $0 \leq y \leq 1$) that is a target. This is because an inorganic substance has the composition so that a sintered body obtained by interposing between materials that contain predetermined elements and sintering a sheet-shaped formed body in step (b) has a structure wherein a $SiO_2$ and/or $AlPO_4$ particle(s) (fine particle(s)) is/are dispersed on at least a surface thereof. As such a particle(s) is/are dispersed on a surface of a sintered body, that is, between a sintered body and a material that contains predetermined elements, it is possible to prevent the sintered body from sticking to the material that contains predetermined elements and to obtain a sheet-shaped lithium ion conductive substance with a high smoothness. Furthermore, when a sintered body is separated from a material that contains predetermined elements, it is difficult for the sintered body to be damaged, so that it is also possible to manufacture a sheet-shaped solid lithium ion conductive substance with a large surface area.

Moreover, it is also preferable for a Li component to be included more than a stoichiometric composition ratio of a composite oxide represented by $Li_{1+x+y}Al_xTi_{2-x}Si_yP_{3-y}O_{12}$ ($0 \leq x \leq 1$ and $0 \leq y \leq 1$). However, if excessive addition thereof is performed, a residual may be provided without a reaction or a by-product may be produced, and hence, it is preferable to control a quantity of added Li appropriately in view of a sintering temperature or the like. For example, it is preferable to be added 10%-30% more than, and it is more preferable to be added 10%-20% more than, an amount of substance of Li in a stoichiometric composition. This is because Li is easy to be vaporized in a sintering step and it is possible to improve a lithium ion conductive property at a grain boundary part by performing preliminary addition at a higher amount.

Furthermore, it is preferable to include a composite oxide represented by $Li_{1+x+y}Al_xTi_{2-x}Si_yP_{3-y}O_{12}$ ($0 \leq x \leq 1$ and $0 \leq y \leq 1$) in an inorganic substance and it is particularly preferable to be included as a main component.

Then, it is also possible to add at least one kind of simple substance selected from Zr, Hf, Y, and Sm or a compound thereof to an inorganic substance other than the above-mentioned components before being formed into a sheet shape. A form of a compound is not particularly limited and it is possible to provide an alloy or oxide that includes at least one kind selected from Zr, Hf, Y, and Sm, or the like. Then, it is sufficient to select a quantity of addition thereof depending on a required ionic conductivity and no particular limitation is provided thereto. However, if a quantity of addition is too high, a residual is provided without a reaction, and hence, for example, it is preferable to be equal to or less than 10 mol % expressed in oxide equivalent in an inorganic substance and it is more preferable to be equal to or less than 5 mol %.

Then, the inorganic substance is formed into a sheet shape wherein forming means are not limited and it is possible to be fabricated by various kinds of publicly-known sheet forming means.

A procedure for forming into a sheet shape will be described below, while a specific example will be provided, and no limitation to the following method is provided.

First, an inorganic substance that has the above-mentioned composition, a solvent, a binder, a plasticizer, and the like are mixed to prepare a raw material slurry or a mixed raw material.

Herein, a binder to be used is not particularly limited. For example, it is possible to provide a conventionally known organic binder such as an ethylene-type copolymer, a styrene-type copolymer, acrylate-type and methacrylate-type copolymers, a vinyl acetate-type copolymer, a maleic acid-type copolymer, a vinyl butyral-type resin, a vinyl acetal-type resin, a vinyl formal-type resin, a vinyl alcohol-type resin, a wax, or a cellulose such as ethyl cellulose.

A solvent to be used is also not limited and it is possible to provide water, an alcohol such as methanol, ethanol, 2-propanol, 1-butanol, or 1-hexanol, a ketone such as acetone or 2-butanone, an aliphatic hydrocarbon such as pentane, hexane, or heptane, an aromatic hydrocarbon such as benzene, toluene, or xylene, an acetic acid ester such as methyl acetate, ethyl acetate, or butyl acetate, or the like. Here, no limitation to one kind is provided and it is also possible to mix and use two or more kinds thereof.

Moreover, it is possible to add a dispersing agent for facilitating deflocculation or dispersion of a raw material powder, a plasticizer for providing a sheet-shaped formed body with a flexibility, a surfactant, an antifoaming agent, or the like.

A raw material slurry or a mixed raw material is prepared by mixing appropriate quantities of the components. Then, it is also possible to be milled and mixed by a ball mill or the like in order to break each particle or homogenize a particle diameter.

It is possible to form an obtained raw material slurry or mixed raw material into a sheet shape by each kind of publicly-known method such as a slurry cast method, a doctor blade method, an extrusion molding method, or a screen printing method.

Then, a size of a sheet is not particularly limited and is appropriately selected depending on an application or the like.

Next, step (b) will be described below. Step (b) is a step for sintering a sheet-shaped formed body (green sheet) obtained at step (a). Specifically, a sheet-shaped formed body fabricated at step (a) is interposed between materials that contain at least one kind of element selected from Zr, Hf, Y, and Sm and sintered.

For a material that contains at least one kind of element selected from Zr, Hf, Y, and Sm to be used at sintering, no limitation is provided and it is possible to be used, as long as a material (substance) contains these elements. For example, it is possible to provide a plate that is composed of these metals or oxides. Here, it is not necessary to contain only these elements, and for example, it is also possible to use one that contains another component in combination, like a zirconia plate stabilized with calcia. Furthermore, for example, it is also possible to use, as such a material, a foil, paste, or powder that contains the above-mentioned elements or the like arranged on a surface of a plate that has a heat resistance such as an alumina, mullite, or platinum plate or a surface of a face that contacts at least a sheet formed body. Moreover, it is also possible to use, as such a material, a substance that contains at least one kind of element selected from Zr, Hf, Y, and Sm, for example, a formed body of powder of these metals or oxides (for example, one formed into a plate shape or a pellet shape).

A size of a material that interposes a sheet-shaped formed body is not particularly limited and it is sufficient to cover a surface of a sheet-shaped formed body to be sintered, wherein it is possible to be selected appropriately depending on a size of the sheet-shaped formed body, a size of a sintering furnace, or the like. Furthermore, it is sufficient to interpose a sheet-shaped formed body between materials as described above, wherein it is not necessary to apply load or use a fixture or the like and it is also possible to apply load so as not to be moved during sintering or provide a fixture so as to readily perform an operation of installation to a sintering furnace or the like.

A sintering temperature is not limited but is selected depending on a degree of a target ionic conductivity or the like, wherein it is preferable to be sintered at 900° C. or higher, in particular, it is preferable to be sintered at 1075° C. or higher for increasing an ion conductive property and density, and it is more preferable to be sintered at 1100° C. or higher. An upper limit of a temperature is also not limited, and in view of a temperature for fusing an ion conductive body to stick to the material that contains predetermined elements, a heat-resistant temperature of the material that contains predetermined elements to be used, or the like, it is preferable to be sintered at a temperature lower than the same. In particular, it is preferable to be sintered at 1250° C. or lower from the viewpoint of a cost or prevention of Li vaporization.

According to a manufacturing method having been described above, it is possible to dope $Li_{1+x+y}Al_xTi_{2-x}Si_yP_{3-y}O_{12}$ with at least one kind of element selected from Zr, Hf, Y, and Sm by a simple operation.

Furthermore, it is possible to prevent vaporization of Li that is included in a sheet-shaped formed body and prevent degradation of a lithium ion conductive property that is caused by reduction of a quantity of Li, because the sheet-shaped formed body at a time of sintering is interposed between materials that contain at least one kind of element selected from Zr, Hf, Y, and Sm and is present under a generally enclosed environment. Moreover, an effect of providing a surface of a sheet-shaped formed body with a sufficient smoothness is also possessed.

Third Embodiment

In the present embodiment, a preferable method will be described for manufacturing an inorganic material that is used at step (a) in the second embodiment and contains a Li component, an Al component, a Ti component, a Si component, and a P component at predetermined ratios. As described for the second embodiment, it is sufficient for an inorganic material that is a raw material to contain each component at a predetermined ratio and no particular limitation is provided, wherein a case where manufacturing is performed by a manufacturing method as described below is preferable because it is possible to manufacture a material with a high conductivity at a temperature lower than a conventional one.

Specifically, characterization is such that the following steps (A) and (B) are included before step (a) as described for the second embodiment.

(A) a step of heating equally to or higher than a decomposition initiation temperature of an ammonium salt and subsequently cooling at a room temperature, a raw material mixture, and milling a product, wherein the raw material mixture includes a Li-containing compound, an Al-containing compound, a Ti-containing compound, a Si-containing compound, and a P-containing compound, wherein at least one of compounds that compose the raw material mixture is a carbonate and further at least one thereof is an ammonium salt, and wherein each compound is contained at the following composition ratio expressed in oxide equivalent:

$Li_2O$: equal to or more than 15 mol % and equal to or less than 30 mol %;

$Al_2O_3$: equal to or more than 1 mol % and equal to or less than 10 mol %;

$TiO_2$: equal to or more than 30 mol % and equal to or less than 45 mol %;

$SiO_2$: equal to or more than 1 mol % and equal to or less than 10 mol %; and $P_2O_5$: equal to or more than 22 mol % and equal to or less than 40 mol %;

(B) a step of heating equally to or higher than a decomposition initiation temperature of a carbonate and subsequently cooling at a room temperature a milled body obtained at step (A) and milling the same.

First, step (A) will be described. Herein, a Li-containing compound, an Al-containing compound, a Ti-containing compound, a Si-containing compound, and a P-containing compound are used as raw materials. Then, at least one of the compounds is a carbonate and further at least one thereof is an ammonium salt.

For a carbonate, for example, it is possible to provide lithium carbonate, aluminum carbonate, or the like. Moreover, for an ammonium salt, it is possible to provide an ammonium phosphate (diammonium hydrogen phosphate or ammonium dihydrogen phosphate) or the like. A kind of compound other than a carbonate or an ammonium salt is not particularly limited, and for example, is capable of being each kind of form such as an oxide, a hydroxide, or a chloride, wherein it is preferable to be an oxide or a hydroxide in view of availability, stability, or the like. Among those, it is more preferable to be an oxide.

Then, it is sufficient for a raw material mixture that is a raw material to contain each compound so as to provide the above-mentioned composition ratio expressed in oxide equivalent. In particular, it is more preferable for a raw material to contain each compound at a rate expressed in oxide equivalent that is 16 mol % or more and 30 mol % or less of $Li_2O$, 2 mol % or more and 6 mol % or less, particularly preferably 4.9 mol % or less, of $Al_2O_3$, 30 mol % or more, particularly preferably 35 mol % or more and 40 mol % or less, of $TiO_2$, 2 mol % or more, particularly preferably 5 mol % or more and 10 mol % or less, of $SiO_2$, and 22 mol % or more and 35 mol % or less of $P_2O_5$.

Here, as has also been described for the second embodiment, it is more preferable to a content(s) of an Al-containing compound and/or a Si-containing compound included as a starting raw material(s) to be greater than a stoichiometric composition ratio of a target composite oxide represented by $Li_{1+x+y}Al_xTi_{2-x}Si_yP_{3-y}O_{12}$ (0≤x≤1 and 0≤y≤1). This is because a composition of a starting raw material satisfies a condition(s) described above, so that a sintered body obtained by sintering a sheet-shaped formed body at step (b) as described for the second embodiment has a structure wherein an $SiO_2$ and/or $AlPO_4$ particle(s) (fine particle(s)) is/are dispersed on at least a surface thereof. As such a fine particle(s) is/are dispersed on a surface of a sintered body, that is, between a sintered body and a material that contains at least one kind of element selected from Zr, Hf, Y, and Sm, it is possible to prevent the sintered body from sticking to the material and obtain a sheet-shaped lithium ion conductive substance with a high smoothness. Furthermore, it is also possible to manufacture a sheet-shaped solid lithium ion conductive substance with a large surface area, because it is difficult to cause damage on a sintered body when the sintered body is separated and recovered from the material that contains predetermined elements.

Moreover, it is also preferable for a Li-containing compound to be included more than a stoichiometric composition ratio of a composite oxide represented by $Li_{1+x+y}Al_xTi_{2-x}Si_yP_{3-y}O_{12}$ (0≤x≤1 and 0≤y≤1). This is because Li is readily vaporized in a sintering step and hence it is possible for preliminary addition to a starting raw material at a high quantity to improve a lithium ion conductive property at a grain boundary part.

In the present step, a temperature of a mixture of the compounds is elevated equally to or higher than a decomposition initiation temperature of an ammonium salt to be heated and decomposed. For a decomposition initiation temperature, for example, it is possible to perform a TG/DTA measurement or a DSC measurement so as to investigate for a target ammonium salt preliminarily, wherein, for example, a temperature of initiation of a weight reduction on a TG curve or the like is meant thereby. If a temperature is elevated at a decomposition initiation temperature calculated based on a TG/DTA measurement, it is possible to cause decomposition, wherein it is preferable to elevate a temperature at a peak temperature on a DTA curve in order to cause decomposition more speedily and certainly. An upper limit of a temperature is not particularly limited, and it is preferable to be lower than a decomposition initiation temperature of a carbonate because heating is performed equally to or higher than the decomposition initiation temperature of the carbonate at step (B).

For example, in a case where ammonium dihydrogen phosphate is used as an ammonium salt, it is sufficient to be heated equally to or higher than 180° C. because decomposition initiates at about 180° C., wherein it is preferable to be heated equally to or higher than 180° C. and equally to or lower than 400° C. in order to cause decomposition certainly. In particular, it is more preferable to be heated equally to or higher than 190° C. and equally to or lower than 250° C.

Then, it is preferable to retain a generally certain period of time so that a decomposition reaction proceeds sufficiently. A retention time is not limited but is determined based on an amount of a sample or the like.

Furthermore, it is possible to conduct heating in air atmosphere wherein an atmosphere is not particularly limited. This is also similar for step (B).

Then, a milling process of a product is performed that is obtained by being cooled at a room temperature after heating. This is performed to homogenize an obtained product and it is sufficient to be milled in a mortar for a certain period of time while it is also possible to perform a milling process more homogenously by using a mill such as a ball mill.

Next, step (B) will be described.

In step (B), temperature of a product obtained at step (A) is elevated equally to or higher than a decomposition initiation temperature of a carbonate to be heated and decomposed. In this case, it is also possible to calculate a decomposition initiation temperature thereof based on a preliminary TG/DTA measurement or the like, similarly to a case of step (A).

For example, in a case where lithium carbonate is used as a raw material, it is sufficient to be heated equally to or higher than 700° C. because decomposition initiates at about 700° C., wherein it is preferable to be heated equally to or higher than 725° C. and equally to or lower than 770° C. in order to be decomposed certainly.

Similarly to a case of step (A), it is preferable to maintain, for a certain period of time, a temperature for heating so that decomposition proceeds sufficiently, wherein such a period of time is not limited.

Furthermore, it is also possible to use a mortar, a ball mill, or the like so as to perform a step for milling after cooling at a room temperature, similarly to a case of step (A). Here, it is also possible to perform a milling process in combination with preparation of a raw material slurry or a mixed raw material in order to form an inorganic substance to a sheet shape at step (a) to be performed after the present step.

According to the above steps, it is possible to prepare a target inorganic substance by a heat process equal to or lower than 800° C. On the other hand, it is possible to manufacture a raw material mixture at a temperature lower than that of a conventional method used for preparing a similar compound, specifically, a method for elevating a temperature of about 1500° C. to cause fusing and a reaction, and it is possible to attain a drastic reduction of energy consumption.

Furthermore, according to a conventional method, it is considered that Li included in a raw material is vaporized to degrade a lithium ion conductive property, because a temperature is elevated at a high temperature of about 1500° C. On the contrary, according to the present manufacturing method, vaporization of Li is prevented because manufacturing is performed by a heat process at a low temperature, and from this viewpoint, it is also possible to improve a lithium ion conductive property.

PRACTICAL EXAMPLES

Although specific practical examples will be provided and described below, the present invention is not limited to these practical examples.

Practical Example 1

Fabrication of a lithium ion conductive substance according to the present invention was performed in accordance with the following procedures.

$Li_2CO_3$, $Li_2TiO_3$, $TiO_2$, $Al(PO_3)_3$, $Al(OH)_3$, $SiO_2$, $H_3PO_4$, $NH_4H_2PO_4$, and $(NH_4)_2HPO_4$ that were raw materials were weighed so as to provide molar ratios expressed in oxide equivalent as shown in Table 1 and these were mixed homogenously.

TABLE 1

| | Molar ratio |
|---|---|
| $Li_2O$ | 1.8 |
| $TiO_2$ | 4.1 |
| $Al_2O_3$ | 0.5 |
| $SiO_2$ | 0.8 |
| $P_2O_5$ | 3.2 |

After a mixed powder body was put into a crucible made of aluminum and sintered by an electric furnace at 190° C. for 2 hours, cooling at a room temperature and dry milling in a mortar were performed. Then, a milled powder was put into a platinum crucible and sintered at 750° C. for 2 hours to obtain a crystalline inorganic substance.

The obtained crystalline inorganic substance was milled by a planetary ball mill (with a rotational frequency of 600 rpm) for 2 hours while ethanol was a dispersion medium.

Here, a zirconia pot was used for a milling process by the planetary ball mill and a ball made of zirconia was used as a medium.

After the milling process was performed, a slurry was prepared in accordance with the following procedures in order to perform a sheet forming.

First, 10% of polyvinyl butyral and 0.2% of a diamine were mixed into the powder milled by the planetary ball mill, for 24 hours, together with a mixed solvent wherein toluene and ethanol were mixed at a volume ratio of 1:1. Then, an obtained slurry was shaped by a sheet forming machine so that formation was performed to have a thickness of 150 µm.

An obtained sheet formed body (green sheet) was dried and subsequently cut into a strip shape and this was interposed between 2 yttria-stabilized zirconia plates and sintered at a predetermined temperature of 800-1150° C., so as to obtain a lithium ion conductive substance.

In order to perform evaluation of the obtained lithium ion conductive substance, each of both faces of each sample was coated with 500 nm of Au. A measurement of an alternating current impedance of the Au-coated sample was performed within a frequency range of $10^6$-0.1 Hz by using an impedance analyzer so as to measure a total conductivity, that is, an ionic conductivity of an entire sample (as calculated from a total sum of a resistance in a crystal grain, a resistance of a grain boundary, and an interface resistance with an electrode). A similar measurement was also performed in another practical example or comparative example below. Results thereof are shown in FIG. 1. FIG. 1 shows an ionic conductivity at 25° C. (measurement temperature) for each sample while a temperature at a time of sintering of a sheet formed body is provided on an X axis.

Accordingly, an ionic conductivity was drastically improved at a sintering temperature equal to or higher than 1075° C., and it could be found that it was preferable to be sintered equally to or higher than 1075° C. in order to obtain a sample with a high ionic conductivity.

Figure 2:
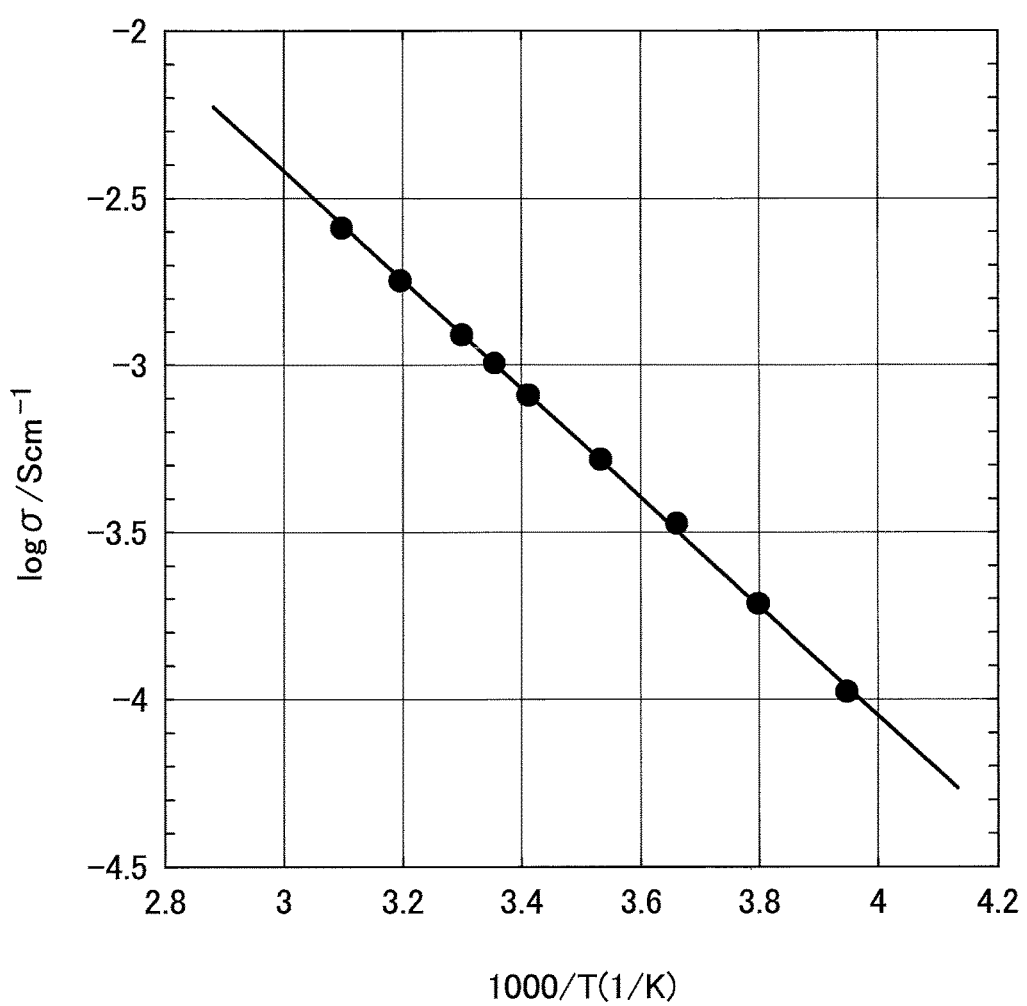
FIG. 2 is a temperature dependence of an ionic conductivity for a sample sintered at 1100° C. and obtained in Practical Example 1 of the present invention.

Herein, FIG. 2 shows a temperature dependence of an ionic conductivity of a sample sintered at 1100° C. Accordingly, it could be found that a high lithium ion conductivity of about $1 \times 10^{-3}$ S/cm was exhibited at 25° C. Furthermore, as a density measurement was performed, it could also be found that, in particular, a material sintered equally to or higher than 1100° C. had a density equal to or higher than about 97%.

Figure 3:
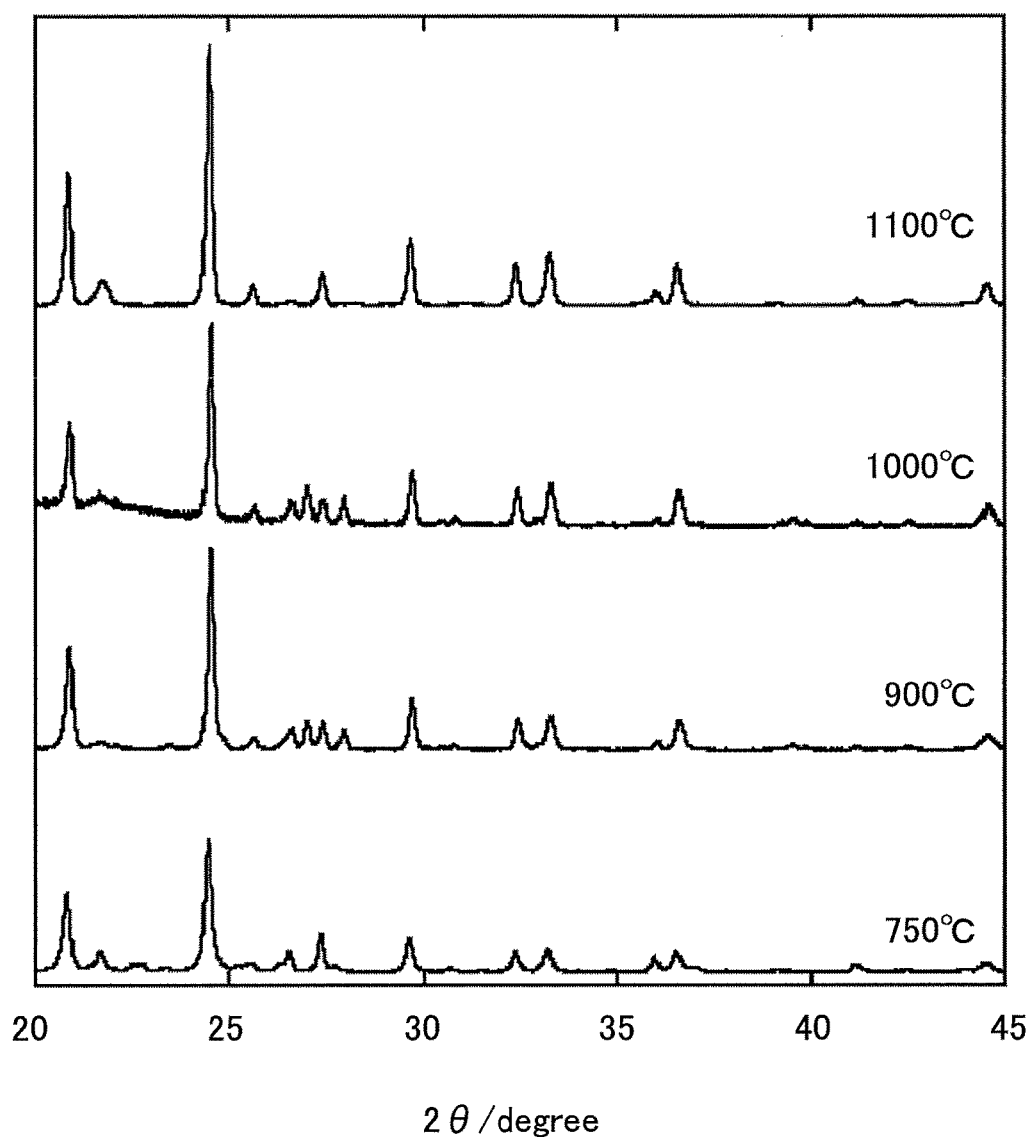
FIG. 3 is an X-ray diffraction pattern of a sample obtained in Practical Example 1 of the present invention.

Next, FIG. 3 shows an X-ray diffraction pattern of obtained samples. A temperature in the figure indicates a sintering temperature for sintering a sheet formed body of each sample. Accordingly, a main peak corresponded to that of $Li_{1+x+y}Al_xTi_{2-x}Si_yP_{3-y}O_{12}$ ($0 \leq x \leq 1$ and $0 \leq y \leq 1$) and a significant change dependent on a sintering temperature was not found. Furthermore, peaks for silica and aluminum phosphate were slightly observed in any sample.

Figure 4:
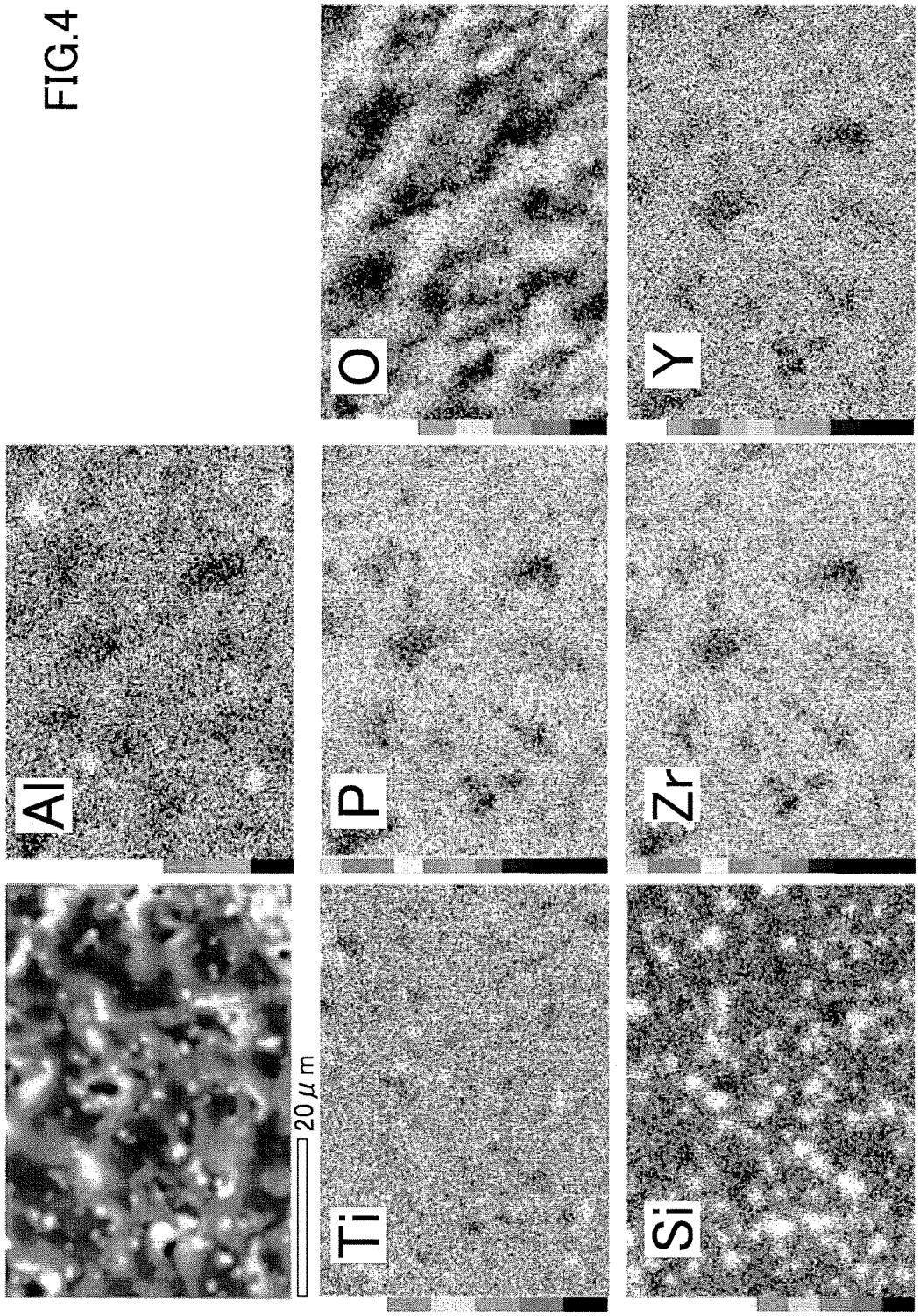
FIG. 4 is an SEM photograph and results of EDX mapping of a sample sintered at 1100° C. and obtained in Practical Example 1 of the present invention.

Then, FIG. 4 shows a SEM photograph and results of EDX mapping of a sample obtained by being sintered at 1100° C. Accordingly, it could be found that small particles present on a sample surface were mainly of silica or aluminum phosphate. Furthermore, peaks for titanium, phosphorous, oxygen, aluminum, silicon, zirconium, and yttrium were identified in EDX, wherein it was confirmed that each component was dispersed generally uniformly. That is, it could be confirmed that Zr and Y were dispersed in an obtained product generally uniformly and presence of a Zr or Y compound could not be confirmed in XRD, so that it could be found that a structure of $Li_{1+x+y}Al_xTi_{2-x}Si_yP_{3-y}O_{12}$ ($0 \leq x \leq 1$ and $0 \leq y \leq 1$) was doped with Zr and Y.

Comparative Example 1

An experiment was performed in conditions and procedures identical to those of Practical Example 1 except that alumina plates were used for sintering a sheet formed body, instead of the zirconia plates. Here, a temperature for interposing between the alumina plates and sintering the sheet formed body was 1100° C.

For evaluation of an obtained sample, similarly to the case of Practical Example 1, both faces thereof was coated with Au and subsequently an ionic conductivity was measured and evaluated by using an impedance analyzer.

As a result of the measurement, the ionic conductivity (total conductivity) at a measurement temperature of 25° C. was $7 \times 10^{-6}$ S/cm and it could be found that the ionic conductivity thereof was drastically lowered as compared with the case of Practical Example 1.

It was confirmed that this was caused by using the alumina plates instead of the zirconia plates at a time of sintering of the sheet formed body in the present comparative example. Accordingly, it was considered that a performance was degraded because $Li_{1+x+y}Al_xTi_{2-x}Si_yP_{3-y}O_{12}$ was not doped with Zr or was doped with Al instead of Zr and Y.

Comparative Example 2

An experiment was performed in conditions and procedures identical to those of Practical Example 1 except that platinum plates were used for sintering a sheet formed body, instead of the zirconia plates. Here, a temperature for interposing between the platinum plates and sintering the sheet formed body was 1100° C.

However, when sintering was performed by being interposed between the platinum plates, a sintered body was stuck to a platinum substrate so that a complete sample was not obtained.

Practical Example 2

An experiment was performed for confirming a tolerance against a bending stress.

In the present practical example, a target lithium ion conductive substance was fabricated in conditions and procedures identical to those of Practical Example 1 except that a sheet formed body was formed by a sheet forming machine so that formation was performed to provide its thickness of 50 µm. Here, a temperature for interposing between zirconia plates and sintering the sheet formed body was 1100° C.

As shown in FIG. 5, a sample had a sufficient tolerance against a bending stress and had a bending tolerance that was a radius of curvature of about 5 cm.

Practical Example 3

In the present practical example, a target lithium ion conductive substance was fabricated in accordance with conditions and procedures identical to those of Practical Example 1 except that zirconia was also added into a starting raw material. Here, a temperature for interposing between zirconia plates and sintering a sheet formed body was 1100° C.

A composition of the raw material as expressed in oxide equivalent was shown in the following Table 2.

TABLE 2

| | Molar ratio |
|---|---|
| $Li_2O$ | 1.8 |
| $TiO_2$ | 4.1 |
| $Al_2O_3$ | 0.5 |
| $SiO_2$ | 0.8 |
| $P_2O_5$ | 3.2 |
| $ZrO_2$ | 0.1 |

Measurement and evaluation of an ionic conductivity (total conductivity) of an obtained sample were performed in accordance with procedures similar to those of Practical Example 1.

As a result of the measurement, the ionic conductivity (total conductivity) at 25° C. (measurement temperature) was $9.7 \times 10^{-4}$ S/cm and it could be found that a performance similar to the case of Practical Example 1 was exhibited.

Practical Example 4

In the present practical example, a target lithium ion conductive substance was fabricated in accordance with conditions and procedures identical to those of Practical Example 3 except that a quantity of zirconia added into a starting raw material was increased than the case of Practical Example 3.

A composition of the raw material as expressed in oxide equivalent was shown in the following Table 3.

TABLE 3

| | Molar ratio |
|---|---|
| $Li_2O$ | 1.8 |
| $TiO_2$ | 4.1 |
| $Al_2O_3$ | 0.5 |
| $SiO_2$ | 0.8 |
| $P_2O_5$ | 3.2 |
| $ZrO_2$ | 0.3 |

An evaluation of an obtained sample was also performed similarly to the case of Practical Example 3.

As a result of a measurement, an ionic conductivity (total conductivity) at 25° C. (measurement temperature) was $9.5 \times 10^{-4}$ S/cm and it could be found that a performance similar to the case of Practical Example 1 was exhibited.

Practical Example 5

In the present practical example, a target lithium ion conductive substance was fabricated in accordance with conditions and procedures identical to those of Practical Example 1 except that a concentration of Li in a starting raw material was changed and that a sheet formed body was formed by a sheet forming machine so that formation was performed to provide its thickness of 50 µm. Here, a temperature for interposing between zirconia plates and sintering the sheet formed body was 1050° C.

A composition of the raw material as expressed in oxide equivalent was shown in the following Table 4.

TABLE 4

| | Molar ratio |
|---|---|
| $Li_2O$ | 1.89 |
| $TiO_2$ | 4.1 |
| $Al_2O_3$ | 0.5 |

TABLE 4-continued

| | Molar ratio |
|---|---|
| $SiO_2$ | 0.8 |
| $P_2O_5$ | 3.2 |

Figure 6:
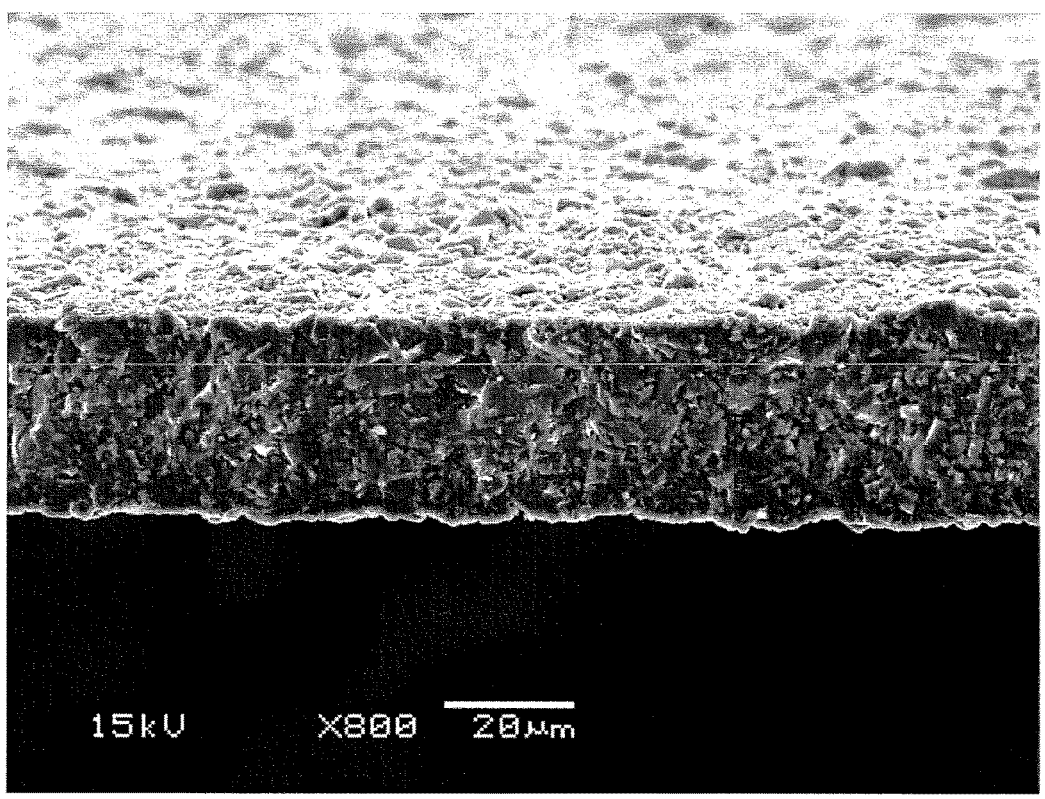
FIG. 6 is an electron microscope photograph of a cross-sectional part of a sheet obtained in Practical Example 5 of the present invention.

In order to observe an internal state of a sheet-shaped Li ion conductive substance obtained by sintering, the Li ion conductive substance was divided in a direction of a sheet thickness and an electron microscope observation of a cross-sectional part thereof was performed. FIG. 6 shows an image of observation. A self-supported film with a thickness of about 40 microns was obtained without sticking to a supporting substrate at a time of the sintering.

Practical Example 6

In the present practical example, a target lithium ion conductive substance was fabricated in accordance with conditions and procedures identical to those of Practical Example 1 except that a composition ratio of a starting raw material was changed, that zirconia was also added into the starting raw material, and that a temperature for interposing between zirconia plates and sintering a sheet formed body was changed. Here, the temperature for interposing between the zirconia plates and sintering the sheet formed body was 970° C.

A composition of the raw material as expressed in oxide equivalent was shown in the following Table 5.

TABLE 5

| | Molar ratio |
|---|---|
| $Li_2O$ | 1.89 |
| $TiO_2$ | 3.89 |
| $Al_2O_3$ | 0.275 |
| $SiO_2$ | 0.46 |
| $P_2O_5$ | 3.2 |
| $ZrO_2$ | 0.05 |

Measurement and evaluation of an ionic conductivity (total conductivity) of an obtained sample were performed in accordance with procedures similar to those of Practical Example 1.

As a result of the measurement, an ionic conductivity (total conductivity) at 25° C. (measurement temperature) was $7 \times 10^{-4}$ S/cm and it could be found that a good ionic conductivity was exhibited.

Practical Example 7

In the present practical example, a target lithium ion conductive substance was fabricated in accordance with conditions and procedures identical to those of Practical Example 6 except that a quantity of zirconia added into a starting raw material was decreases as compared with the case of Practical Example 6.

A composition of the raw material as expressed in oxide equivalent was shown in the following Table 6.

TABLE 6

| | Molar ratio |
|---|---|
| $Li_2O$ | 1.89 |
| $TiO_2$ | 3.89 |
| $Al_2O_3$ | 0.275 |

TABLE 6-continued

| | Molar ratio |
|---|---|
| SiO$_2$ | 0.46 |
| P$_2$O$_5$ | 3.2 |
| ZrO$_2$ | 0.025 |

Measurement and evaluation of an ionic conductivity (total conductivity) of an obtained sample were performed in accordance with procedures similar to those of Practical Example 1.

As a result of the measurement, an ionic conductivity (total conductivity) at 25° C. (measurement temperature) was 7.5×10$^{-4}$ S/cm and it could be found that a good ionic conductivity was exhibited.

Practical Example 8

In the present practical example, a target lithium ion conductive substance was fabricated in accordance with conditions and procedures identical to those of Practical Example 7 except that a quantity of zirconia added into a starting raw material was decreased as compared with the case of Practical Example 7 and that a temperature for interposing between zirconia plates and sintering a sheet formed body was 1050° C.

A composition of the raw material as expressed in oxide equivalent was shown in the following Table 7.

TABLE 7

| | Molar ratio |
|---|---|
| Li$_2$O | 1.89 |
| TiO$_2$ | 3.89 |
| Al$_2$O$_3$ | 0.275 |
| SiO$_2$ | 0.46 |
| P$_2$O$_5$ | 3.2 |
| ZrO$_2$ | 0.0175 |

Measurement and evaluation of an ionic conductivity (total conductivity) of an obtained sample were performed in accordance with procedures similar to those of Practical Example 1.

As a result of the measurement, an ionic conductivity (total conductivity) at 25° C. (measurement temperature) was 7.6×10$^{-4}$ S/cm.

Although the preferred practical examples of the present invention have been described above in detail, the present invention is not limited to such particular embodiments and a variety of alterations or modifications thereof are capable within the scope of the essence of the present invention as recited in the claims.

What is claimed is:

1. A lithium ion conductive substance comprising:
a compound including a composite oxide represented by Li$_{1+x+y}$Al$_x$Ti$_{2-x}$Si$_y$P$_{3-y}$O$_{12}$ doped with at least one element selected from a group consisting of Hf, Y, and Sm, where 0≤x≤0.4 and 0<y≤0.6,
wherein a raw material of the lithium ion conductive substance includes an inorganic substance including a Li component, an Al component, a Ti component, a Si component, and a P component, and is generated by a process including
preparing a raw material mixture including an Li-containing compound, an Al-containing compound, a Ti-containing compound, an Si-containing compound, and a P-containing compound, wherein the raw material mixture includes at least one compound that is a carbonate and at least one other compound that is an ammonium salt;
first heating the raw material mixture to a temperature that is higher than or equal to a decomposition initiation temperature of the ammonium salt and lower than a decomposition initiation temperature of the carbonate, and subsequently cooling the raw material mixture to room temperature, to generate a product containing each of the components at composition ratios expressed in oxide equivalents that are 15 mol % or more and 30 mol % or less for Li$_2$O, 1 mol % or more and 10 mol % or less for Al$_2$O$_3$, 30 mol % or more and 45 mol % or less for TiO$_2$, 1 mol % or more and 10 mol % or less for SiO$_2$, and 22 mol % or more and 40 mol % or less for P$_2$O$_5$;
first milling the product into a milled product;
second heating the milled product to a temperature higher than or equal to the decomposition initiation temperature of the carbonate and lower than or equal to 800° C., and subsequently cooling the milled product to room temperature; and
second milling the heated and subsequently cooled milled product into the inorganic substance.

2. The lithium ion conductive substance as claimed in claim 1, wherein the composite oxide represented by Li$_{1+x+y}$Al$_x$Ti$_{2-x}$Si$_y$P$_{3-y}$O$_{12}$ is further doped with Zr.

3. A lithium ion conductive solid electrolyte comprising:
the lithium ion conductive substance as claimed in claim 1.

4. A protective layer for an electrode of a lithium ion battery, comprising:
a lithium ion conductive substance comprising:
a compound including a composite oxide represented by Li$_{1+x+y}$Al$_x$Ti$_{2-x}$Si$_y$P$_{3-y}$O$_{12}$ doped with at least one element selected from a group consisting of Hf, Y, and Sm, where 0≤x≤0.4 and 0<y≤0.6,
wherein a raw material of the lithium ion conductive substance includes an inorganic substance including a Li component, an Al component, a Ti component, a Si component, and a P component, and is generated by a process including
preparing a raw material mixture including an Li-containing compound, an Al-containing compound, a Ti-containing compound, an Si-containing compound, and a P-containing compound, wherein the raw material mixture includes at least one compound that is a carbonate and at least one other compound that is an ammonium salt;
first heating the raw material mixture to a temperature that is higher than or equal to a decomposition initiation temperature of the ammonium salt and lower than a decomposition initiation temperature of the carbonate, and subsequently cooling the raw material mixture to room temperature, to generate a product containing each of the components at composition ratios expressed in oxide equivalents that are 15 mol % or more and 30 mol % or less for Li$_2$O, 1 mol % or more and 10 mol % or less for Al$_2$O$_3$, 30 mol % or more and 45 mol % or less for TiO$_2$, 1 mol % or more and 10 mol % or less for SiO$_2$, and 22 mol % or more and 40 mol % or less for P$_2$O$_5$;
first milling the product into a milled product;
second heating the milled product to a temperature higher than or equal to the decomposition initiation temperature of the carbonate and lower than or equal to 800° C., and subsequently cooling the milled product to room temperature; and second milling the heated and subsequently cooled milled product into the inorganic substance.

* * * * *